US006828906B2

(12) United States Patent
Malcolm et al.

(10) Patent No.: US 6,828,906 B2
(45) Date of Patent: Dec. 7, 2004

(54) DEVICE FOR RESPONDING TO STATE REQUEST ON AN OPEN PHONE LINE

(75) Inventors: Jerry Walter Malcolm, Austin, TX (US); Nicholas James Noecker, Jr., Houston, TX (US); Paul Stuart Williamson, Round Rock, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 10/383,300

(22) Filed: Mar. 6, 2003

(65) Prior Publication Data

US 2004/0174969 A1 Sep. 9, 2004

(51) Int. Cl.[7] .............................................. G08B 26/00
(52) U.S. Cl. .................. 340/505; 340/870.02; 340/506; 379/106.03; 379/106.07
(58) Field of Search ....................... 340/870.01, 870.02, 340/514, 506, 531, 534, 660, 663, 505; 379/45, 106.03, 106.07, 106.11

(56) References Cited

U.S. PATENT DOCUMENTS

| | | | |
|---|---|---|---|
| 4,086,434 A | 4/1978 | Bocchi | 179/2 AM |
| 4,742,536 A | 5/1988 | Dewenter et al. | 379/97 |
| 4,763,349 A | 8/1988 | Siegel et al. | 379/38 |
| 5,889,835 A * | 3/1999 | Estes | 379/22.03 |
| 6,021,324 A | 2/2000 | Sizer, II et al. | 455/403 |
| 6,429,779 B1 | 8/2002 | Petrillo et al. | 340/644 |
| 6,452,490 B1 | 9/2002 | Garland et al. | 340/506 |
| 6,587,545 B1 * | 7/2003 | Antonucci et al. | 379/37 |
| 6,687,574 B2 * | 2/2004 | Pietrowicz et al. | 700/293 |
| 6,690,932 B1 * | 2/2004 | Barnier et al. | 455/414.1 |

FOREIGN PATENT DOCUMENTS

WO  WO00058738 A1  10/2000  ........... G01R/11/04

* cited by examiner

Primary Examiner—Daryl C. Pope
(74) Attorney, Agent, or Firm—Mark S. Walker; Gregory K. Goshorn; Fortkort Grether + Kelton LLP

(57) ABSTRACT

Provided is an apparatus and method for detecting a state of a device such as a meter or appliance and transmitting to a remote location a particular tone or tones corresponding to the detected state. The transmission is initiated either by a predetermined series of tones from the remote location to the apparatus or by changing conditions within the device. The claimed subject matter enables a service provider to detect a service outage, the scope of the outage and the resumption of service.

28 Claims, 5 Drawing Sheets

DEVICE FOR RESPONDING TO STATE REQUEST ON AN OPEN PHONE LINE

TECHNICAL FIELD

The present invention relates generally to remote monitoring of home devices and, more specifically, to a system and method for interrogating, from a remote location, a device in order to retrieve diagnostic information.

BACKGROUND OF THE INVENTION

Currently, when a customer of a service company such as an electric company reports a service outage, the service company must dispatch a representative to determine whether the outage is caused by equipment that is the responsibility of the service company (e.g. a blown transformer) or the customer (e.g. a blown electrical fuse). Each time a representative is dispatched, expenditures of time and money are incurred by the service company, even though the reported problem may not be the responsibility of the service company. In the event of outages at multiple locations, a representative may be sent to one location at the expense of another, thus creating a misallocation of limited company resources. In addition, it is often difficult to determine whether or not a specific repair has been successful.

SUMMARY OF THE INVENTION

Provided is an apparatus and method for detecting the state of a device and transmitting to a remote location a particular tone or tones corresponding to the detected state. The state detection and transmission is initiated either by a predetermined series of tones from the remote location to the apparatus or by a change in the state of the device. The claimed apparatus may be coupled to a device such as, but not limited to, an appliance or meter or, in the alternative, an integral part of the device.

In one embodiment, the claimed apparatus is coupled to both an electric meter and a telephone line. If an electric customer reports a power outage, the electrical service provider responsible for the meter can determine whether there is power to the meter without sending a service person to the customer's location. In response to a predetermined series of tones transmitted from the electrical service provider to the apparatus via the telephone line, the apparatus determines whether a specific voltage level is present at the electrical meter. If the specific voltage level is present at the meter, then a particular tone is transmitted from the apparatus to the service provider, indicating to the service provider that a reported power outage is not the result of the service provider's equipment and that the customer may need to be advised to call an electrician. If the specific voltage level in not present at the meter, a second, different tone is transmitted and the service provider can dispatch a service person, knowing that the reported problem originates on the service provider's side of the electrical meter. In this manner, unnecessary service calls are reduced or eliminated and the service provider can allocate resources more efficiently. In addition, transmissions from multiple locations enable the service provider to determine the scope of a problem.

In addition to electrical service providers, the claimed subject matter is applicable to any service provider or user with a need to monitor somthing such as, but not limited to, major appliances, cable boxes, gas lines and even such things as a chemical level in a swimming pool. For example, if a consumer complains to a television manufacturer about a broken television, the manufacturer can send signal to the television via cellular telephone receiver in the television and determine whether the television is receiving power and a suitable cable signal. A signal from the television to the manufacturer can utilize the same cellular telephone connection.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE PREFERRED EMBODIMENT

Figure 1:
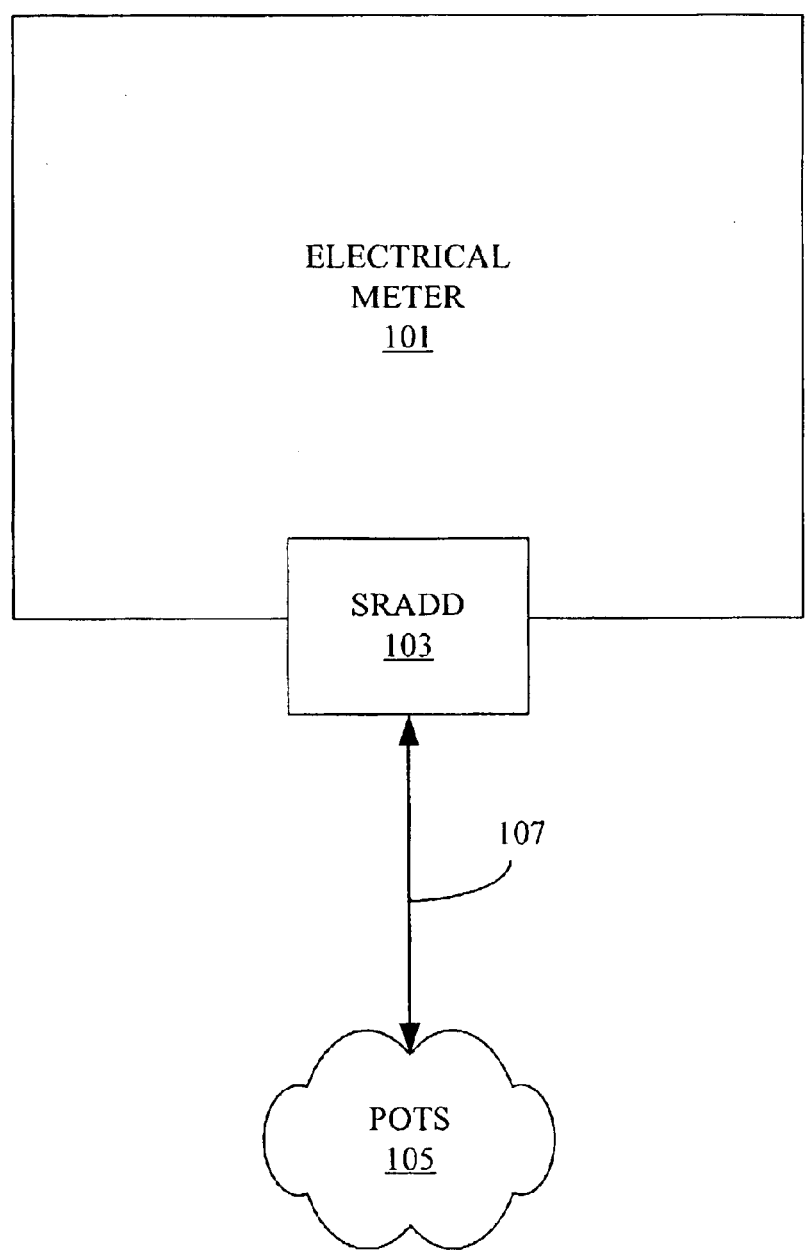
FIG. 1 is a block diagram of an electrical meter incorporating an exemplary state response and detection device (SRADD) of the claimed subject matter.

Although described with particular reference to a device that monitors an electrical meter, the state response and detection device (SRADD) and method of the disclosed embodiment can be implemented in any system in which remote error diagnosis is desirable. FIG. 1 illustrates an exemplary electrical meter in which the system according to the present invention is implemented. Those with skill in the electrical arts will recognize that the disclosed embodiments have relevance to a wide variety of devices and situations in addition to those described below. In addition, the SRADD of the present invention can be implemented in software, hardware, or a combination of software and hardware. The hardware portion can be implemented using specialized logic; the software portion can be stored in a memory and executed by a suitable instruction execution system such as a microprocessor.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared of semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

FIG. 1 is a block diagram of a system 100 that includes an electrical meter 101 and an exemplary SRADD 103. SRADD 103 can either be incorporated into or affixed to the electrical meter 101. It should be noted that SRADD 103 can be added to an existing meter and isolated from high voltage (meters typically operate at a much higher voltage than phone systems) by use of a relay or an induction type of device. SRADD 103 doesn't have to be directly attached to the meter. Although since the meter is typically the transition point for service company responsibility, SRADD 103 should be as close as possible to the meter if not attached. Electrical meter 101 is typically attached to a home, business or other structure (not shown) and meters the electrical usage of the structure. Electrical meters and their usage should be familiar to those with skill in the electrical arts.

SRADD 103 is coupled to a standard telephone system, or plain old telephone system (POTS) 105, via a telephone line 107. In alternative embodiments of the invention, the SRADD 103 is coupled to the Internet via a network connection or communicatively coupled to a control center (not shown) via any other type of connection, e.g. a dedicated line or wireless connection. The precise mechanics of the communication between the SRADD 103 and a control center or other user who employs SRADD 103 to monitor the electrical meter 101 is not critical to the spirit of the invention.

In addition, electrical meter 101 is only an example of the type of service or device that can be attached to SRADD 103 to provide remote trouble detection and diagnostic capabilities. SRADD 103 can also be employed to monitor and diagnose other types of devices such as, but not limited to, a water meter, a gas line, a network connection, a cable television box, an appliance, and a chemical level such as in a swimming pool. Among other things, the claimed subject matter is applicable for monitoring any device or measurement that can be expressed by means of a Boolean good/bad indicator.

Figure 2:
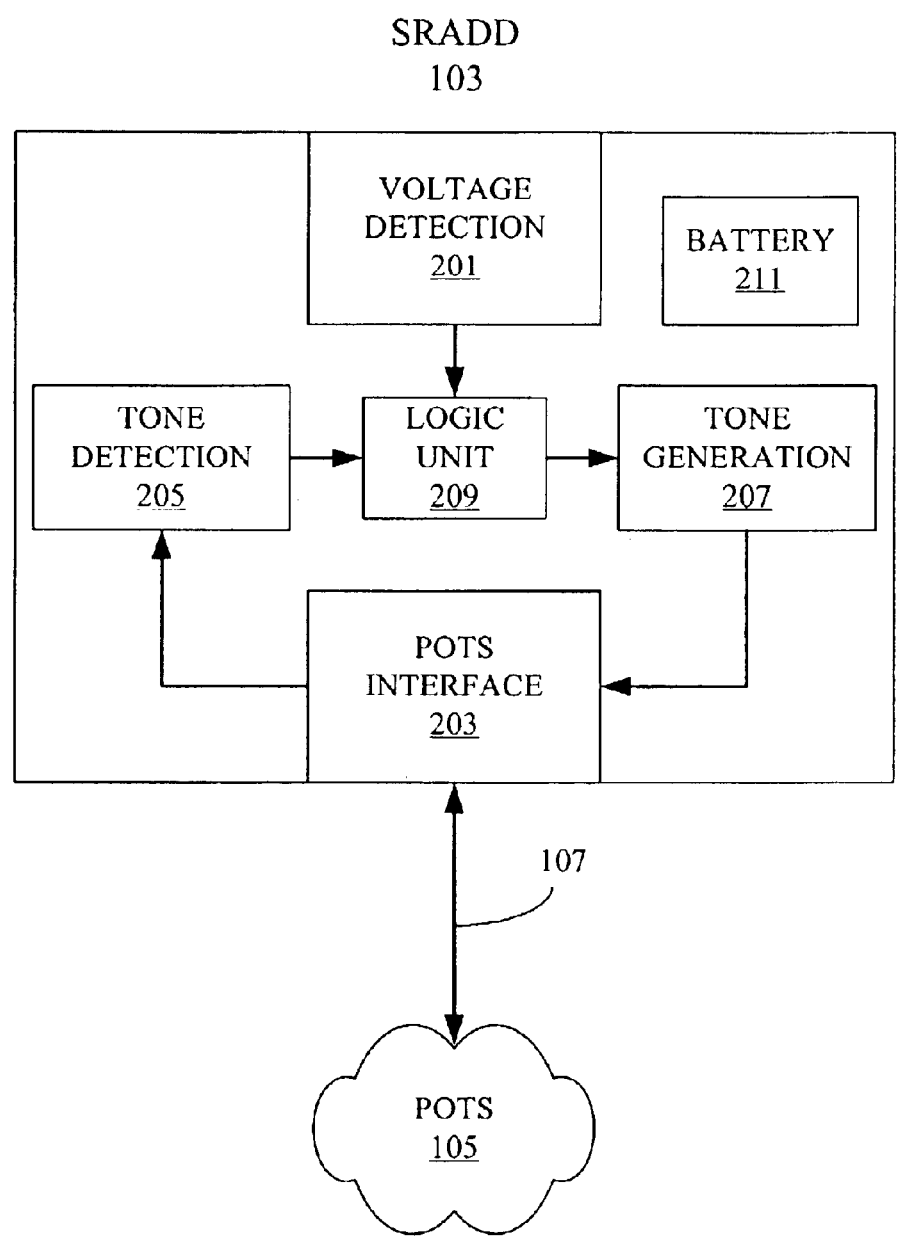
FIG. 2 is a block diagram showing the SRADD of FIG. 1 in more detail.

FIG. 2 is block diagram of SRADD 103 of FIG. 1 in more detail. SRADD 103 includes a communication, or POTS, interface 203 for transmitting and receiving tones via POTS 105 and connection 107 (FIG. 1). POTS interface 203 monitors connection 107 and in effect looks like an extension phone attached to connection 107. When connection 107 is an open line (i.e. there is a call in progress), any signal tones received on the open line are transmitted from POTS interface 203 to a tone detection unit 205. When a customer calls to report a service outage, a specific tone or tones are sent by service personnel or, in the alternative, from an automated monitoring system to signal SRADD 103 that the transmitting service personnel or monitoring system requests a status check of electrical meter 101. If tone detection unit 205 determines the received tones match a predetermined sequence of tones, then a signal is transmitted to a logic unit 209 indicating a tone pattern match has occurred.

Connection 107 can be a dedicated or non-dedicated connection. In the case of a non-dedicated connection, logic in POTS interface 203 determines whether or not a received signal corresponds to an attempt to connect to SRADD 103.

A voltage detection unit 201 is coupled to electrical meter 101 (FIG. 1) and measures a voltage level at an appropriate point in electrical meter 101. In this example, the voltage level detected by voltage detection unit 201 corresponds to whether or not electrical meter 101 is receiving power from a connected power line (not shown). For example, if power is interrupted between a utility company and electrical meter 101, then the voltage level is zero (0) volts. Conversely, if service is restored and electric meter 101 is receiving power, the power level is one hundred ten (110) volts. As mentioned above, electrical meter's 101 actual voltage is lowered by a relay or induction device (not shown) so that SRADD 103 and voltage detection unit 201 process a low voltage signal, typically +5 volts. Voltage detection unit 201 transmits the voltage level information to logic unit 209. In an alternative embodiment, multiple voltage levels are detected, monitored and reported.

Logic unit 209, after receiving tone information from tone detection unit 205 and voltage level information from voltage detection unit 201, determines an appropriate response to send the service personnel or automated system that initiated the inquiry. Logic unit 209 signals a tone generation unit 207, which transmits one or more tones, corresponding to the detected state of electrical meter 101, to the service personnel or automated system via POTS interface 203, communication link 107 and POTS 105. As mentioned above, POTS 105 and communication link 107 may be another type of communication link such as, but not limited to, a network connection or a system of wireless transmitters and receivers. A battery 211 provides power for SRADD 103 and its components and is available to supply a reference voltage to voltage detection unit 201, if necessary.

In an alternative embodiment, logic unit 209 initiates a signal to tone generation unit 207 and call to service personnel through POTS interface 203 whenever voltage detection unit 201 detects that a power interruption has occurred. In other words, SRADD 103 can be configured to signal a problem on its own initiative rather than waiting for a query from service personnel or automated system.

Figure 3:
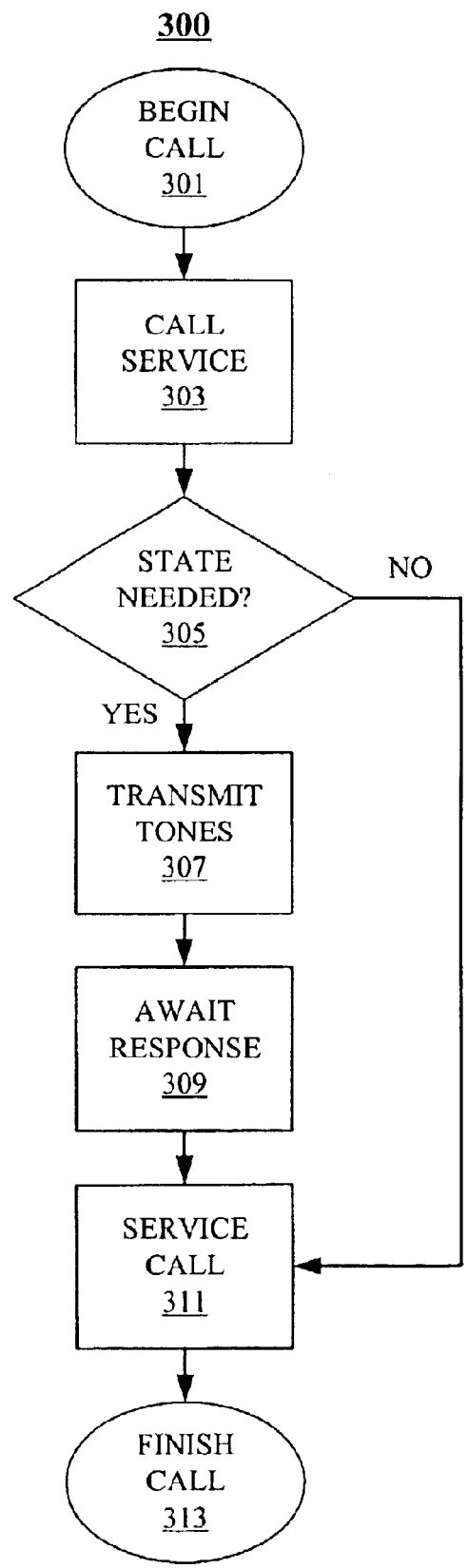
FIG. 3 is a flow chart showing an embodiment of the claimed subject matter from the perspective of users.

FIG. 3 is a flow chart 300 showing an embodiment of the caimed subject matter from the perspective of the users of the system 100 (FIG. 1). Processing begins in a "Begin Call" step 401 in which SRADD 103 is attached to connection 107 (FIGS. 1 and 2). Process 300 then proceeds to a "Call Service" step 303 in which a consumer calls a service company to report a service outage and request service. At this point, SRADD 103 detects that connection 107 is "off-hook" (i.e. a user is making a call). Processing executed by SRADD 103 is explained in conjunction with FIGS. 4 and 5 below.

Once the user has established a connection to service personnel via connection 107, control then proceeds to a "State Needed?" step 305 in which the service personnel determines whether or not to request the status or state of the customer's meter 101 via SRADD 103. If the service personnel does not need the status or state, then control proceeds to a "Service Call" step 311 in which the service personnel performs the necessary actions to address the customer's problems. If in step 305 the service personnel determines that information relating to the state or status of the customer's meter 101 would help diagnose and address the customer's problem, then control proceeds to a "Transmit Tones" step 307 in which the service personnel transmits, via connection 107, one or more, predetermined tones. As explained below in conjunction with FIG. 3, SRADD 103 receives the tones and begins processing the request for information.

It should be noted that the term "tones" is meant to imply touch tones commonly associated with telephone networks. Although the description employs touch tones as an example, those with skill in the telephony and computing arts should recognize that there are many ways for signals to be transmitted via a connection, regardless of whether the connection is a network connection, telephone line or any other type of medium. The signaling examples described herein are not meant to limit the particular signaling techniques employed to touch tones.

Once the service personnel has transmitted tones in ste 307, control proceeds to an "Await Response" step 309 in which the service personnel gives SRADD 103 time to perform a status check and reply with one or more tones corresponding to the state of electrical meter 101. Once the service personnel has received a reply, control proceeds to Service Call step 311 in which the service personnel performs the necessary actions to address the customer's problems, based upon the information transmitted from SRADD 103. From step 311, control then proceeds to a "Complete Call" step 313 in which the service call is complete.

Figure 4:
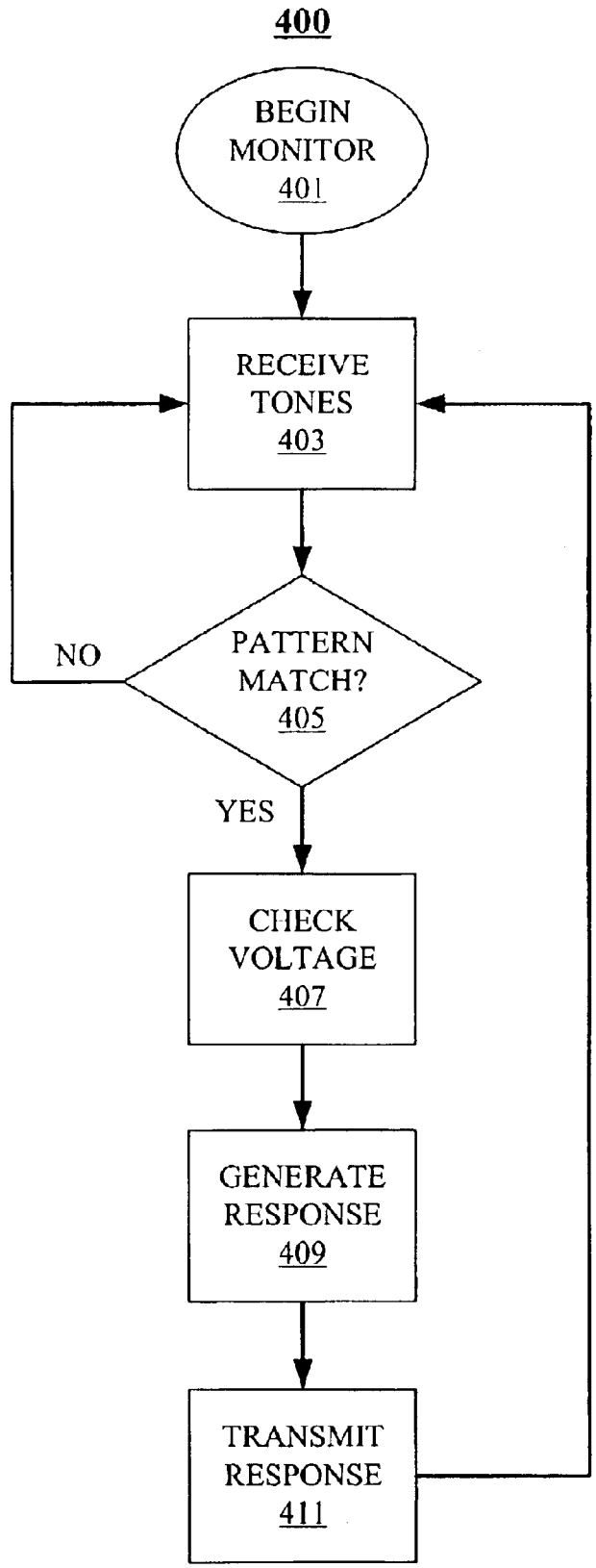
FIG. 4 is a flow chart showing processing of the SRADD of FIGS. 1 and 2.

FIG. 4 is a flow chart 400 illustrating the processing of SRADD 103 of FIGS. 1 and 2. Processing begins in a "Begin Processing" step 401 in which the SRADD 103 is first initialized or powered on. At this point, the electrical meter 101 can be queried as to its operating state by a remote user via the connection 107 and POTS 105 (FIGS. 1 and 2). Control then proceeds to a "Receive Tones" step 403 in which Tone Detection device 205 (FIG. 2) detects any signal tones arriving through POTS interface 203. As mentioned above, in the case of a non-dedicated connection 107, POTS interface 203 is responsible for determining the existence of a connection request and, if so, establishing that connection. Once a series of tones are received, control proceeds to a "Pattern Match?" step 405 in which the tone detection device 205 determines whether the receive tones match a predetermined pattern, indicating that a remote query request has been received by the SRADD 103.

If in step 405 tone detection unit 205 determines a match has occurred, then control proceeds to a "Check Voltage" step 407 in which logic unit 209 requests a voltage reading from voltage detection unit 201. In an alternative embodiment, voltage detection unit continuously monitors the relevant voltage of the electrical meter 101 and makes the information available to logic unit 209. In that case, logic unit 209 simply reads a voltage level from voltage detection unit 201 rather than requesting and then reading a voltage level. Control then proceeds to a "Generate Response" step 409 in which control unit 209 signals tone generation unit 207 to generate a response signal corresponding to the voltage state read in step 407. It should be noted that the generated response can also include information in addition to a voltage level, including, but not limited to, a service address and/or information on corresponding to the particular meter 101.

If in step 405 tone detection unit 205 determines the predetermined tone pattern has not been matched, then control returns to Receive Tones step 403 and SRADD 103 and tone detection unit 205 continues to monitor POTS interface 203 as explained above. It should be noted that there is no "End" or "Completion" block in process 400 because, once initiated, it is contemplated that the monitoring and notification functions of SRADD 103 are ongoing, i.e. the functions continue until SRADD 103 is powered off or disconnected.

Figure 5:
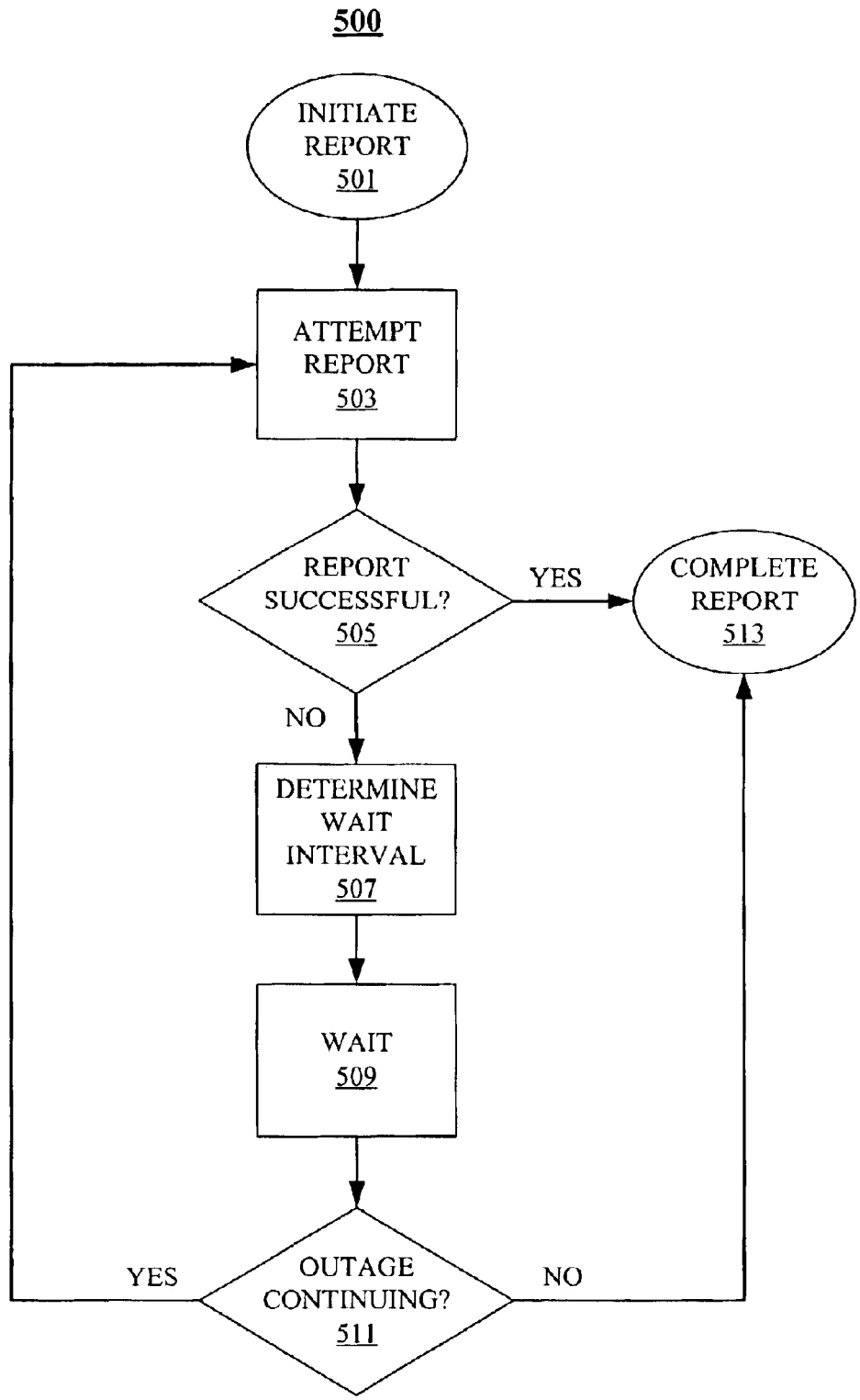
FIG. 5 is a flow chart showing processing involved with signaling the state of the SRADD of FIGS. 1 and 2.

FIG. 5 is a flow chart 500 showing the processing involved with signaling the state of the SRADD of FIGS. 1 and 2 in a situation in which SRADD 103 detects an outage and attempts to automatically report the outage to the power company. Process 500 corresponds to Transmit Response step 411, explained above in conjunction with FIG. 4. Processing begins in an "Initiate Report" step 501 and immediately proceeds to an "Attempt Report" step 503 in which a connection is attempted through POTS interface 203 (FIG. 2). Control then proceeds to a "Report Successful?" step 505 in which SRADD 103 determines whether or not the attempted contact was successful. Of course in the case of a service personnel initiating a query over a POTS line and system 105 and 107, a report would likely be successful because the connection is already established. However, in the case of a wireless connection or if the report is initiated by SRADD 103, it is more likely that an attempt to transmit a report or make a connection could be unsuccessful.

If in step 505 SRADD 103 determines the report is successful, then control proceeds to a "Complete Report" step 513 in which process 500 is complete. If in step 505 SRADD 103 determines the report was unsuccessful, then control proceeds to a "Determine Wait Interval" step 507. The determination of a specific wait interval may depend upon several factors. For example, the wait interval may depend upon the number of contact attempts that SRADD 103 has made. The wait interval may be set to a fixed amount of time regardless of the number of attempts or a "back-off" scheme in which the wait interval increases each time an additional unsuccessful attempt has been made. Control then proceeds to a "Wait" step 509 in which SRADD 103 waits the amount of time determined in step 507.

Following the wait imposed in step 509, control proceeds to an "Outage Continuing?" step 511 in which SRADD 103, in the case of a service outage initiating the report attempt, determines whether or not the conditions that initiated the service outage persist. If not, control proceeds to Complete Report step 513 where process 500 is complete. If the outage persists in step 511, then control proceeds to Attempt Report step 503 and processing continues as described above. In an alternative embodiment, control proceeds from step 511 to step 503 even though the outage has not persisted. In that case, SRADD 103 signals that an outage has occurred but is now over.

One advantage of employing multiple attempts to signal an outage is that often, in the case of an electrical outage, multiple structures are involved and phone lines into a service facility such as an electric company may by clogged by too many calls. By spreading the multiple calls over time, the electric company can process all the calls, determine the scope of the outage from the locations of the individual calls and, in some cases, even determine potential causes of the outage. In the event service resumptions are also reported as explained above, the electric company can also determine whether or not a attempted repair has been successful.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified steps performed in the same or a different order.

We claim:

1. A state detection and response apparatus, comprising:
 a communication interface for communicating via a communication link;
 a state detection unit for determining a state of a device coupled to the state detection and response apparatus;
 a tone detection unit for identifying a predetermined sequence of tones received via the communication interface;
 a logic unit coupled to the tone detection unit and the state detection unit for analyzing the state of the device and the predetermined sequence of tones; and
 a tone generation unit coupled to the logic unit for transmitting, via the communication interface, at least one tone of a plurality of tones, each tone corresponding to a particular analysis produced by the logic unit.

2. The state detection and response apparatus of claim 1, wherein the state of the device corresponds to a boolean good/bad indication.

3. The state detection and response apparatus of claim 1, wherein the device is an electrical meter.

4. The state detection and response apparatus of claim 1, wherein the device is a cable television receiver and the state corresponds to a received cable signal.

5. The state detection and response apparatus of claim 1, wherein the device is an appliance.

6. The state detection and response apparatus of claim 1, wherein the communication link is a telephone line.

7. The state detection and response apparatus of claim 1, wherein the communication link includes a wireless connection.

8. The state detection and response apparatus of claim 1, wherein the communication link is a network connection.

9. The state detection and response apparatus of claim 1, wherein, in the event of a failure of a transmission of the at least one tone of a plurality of tones, the tone generation unit retransmits the at least one tone following a wait interval.

10. The state detection and response apparatus of claim 1, wherein the at least one tone of a plurality of tones provides information about the state of the device and a location of the device.

11. An electrical meter, comprising;
    a electrical service usage meter; and
    a state detection and response apparatus, the state detection and response apparatus comprising:
        a communication interface for communicating via a communication link;
        a state detection unit for determining a state of the electrical meter;
        a tone detection unit for identifying a predetermined sequence of tones received via the communication interface;
        a logic unit coupled to the tone detection unit and the state detection unit for analyzing the state of the electrical meter and the predetermined sequence of tones; and
        a tone generation unit coupled to the logic unit for transmitting, via the communication interface, at least one tone of a plurality of tones, each tone corresponding to a particular analysis produced by the logic unit.

12. The electrical meter of claim 11, wherein the state of the electrical meter corresponds to a voltage level.

13. The electrical meter of claim 11, wherein the communication link is a telephone line.

14. The electrical meter of claim 11, wherein the communication link includes a wireless connection.

15. The electrical meter of claim 11, wherein, in the event of a failure of a transmission of the at least one tone of a plurality of tones, the tone generation unit retransmits the at least one tone following a wait interval.

16. The electrical meter of claim 11, wherein the at least one tone of a plurality of tones provides information about the state of the electrical meter and a location of the electrical meter.

17. A method of determining the state of a device, comprising the steps of:
    detecting a predetermined series of tones transmitted via a communication link;
    determining a state of a device in response to the detection of the predetermined series of tones;
    correlating the state of the device to at least one response tone; and
    transmitting, via the communication link, the at least one response tone.

18. The method of claim 17, wherein the communication link is a telephone connection.

19. The method of claim 17, wherein the communication link includes a wireless connection.

20. The method of claim 17, wherein the device is an electrical meter and the state of the device corresponds to a voltage level.

21. The method of claim 17, further comprising the steps of:
    calculating a wait period in the event of a transmission error;
    waiting a period of time corresponding to the wait period; and
    retransmitting, via the communication link and after the waiting step, the at least one response tone.

22. The method of claim 17, further comprising the steps of:
    correlating the at least one response tone to a location of the device; and
    transmitting information, corresponding to the location, in conjunction with the at least one response tone.

23. A computer program product for determining the state of a device, comprising;
    means, stored on a recording medium, for detecting a predetermined series of tones transmitted via a communication link;
    means, stored on the recording medium, for determining a state of a device in response to the detection of the predetermined series of tones;
    means, stored on the recording medium, for correlating the state of the device to at least one response tone; and
    means, stored on the recording medium, for transmitting, via the communication link, the at least one response tone.

24. The computer program product of claim 23, wherein the communication link is a telephone connection.

25. The computer program product of claim 23, wherein the communication link is a computer network connection.

26. The computer program product of claim 23, wherein the device is an electrical meter and the state of the device corresponds to a boolean good/bad indication.

27. The computer program product of claim 23, further comprising:
    means, stored on the recording medium, for calculating a wait period in the event of a transmission error;
    means, stored on the recording medium, for waiting a period of time corresponding to the wait period; and
    means, stored on the recording medium, for retransmitting, via the communication link and after the waiting period, the at least one response tone.

28. The computer program product of claim 23, further comprising:
    means, stored on the recording medium, for correlating the at least one response tone to a location of the device; and
    means, stored on the recording medium, for transmitting information, corresponding to the location, in conjunction with the at least one response tone.

* * * * *